United States Patent Office 3,500,788
Patented Mar. 17, 1970

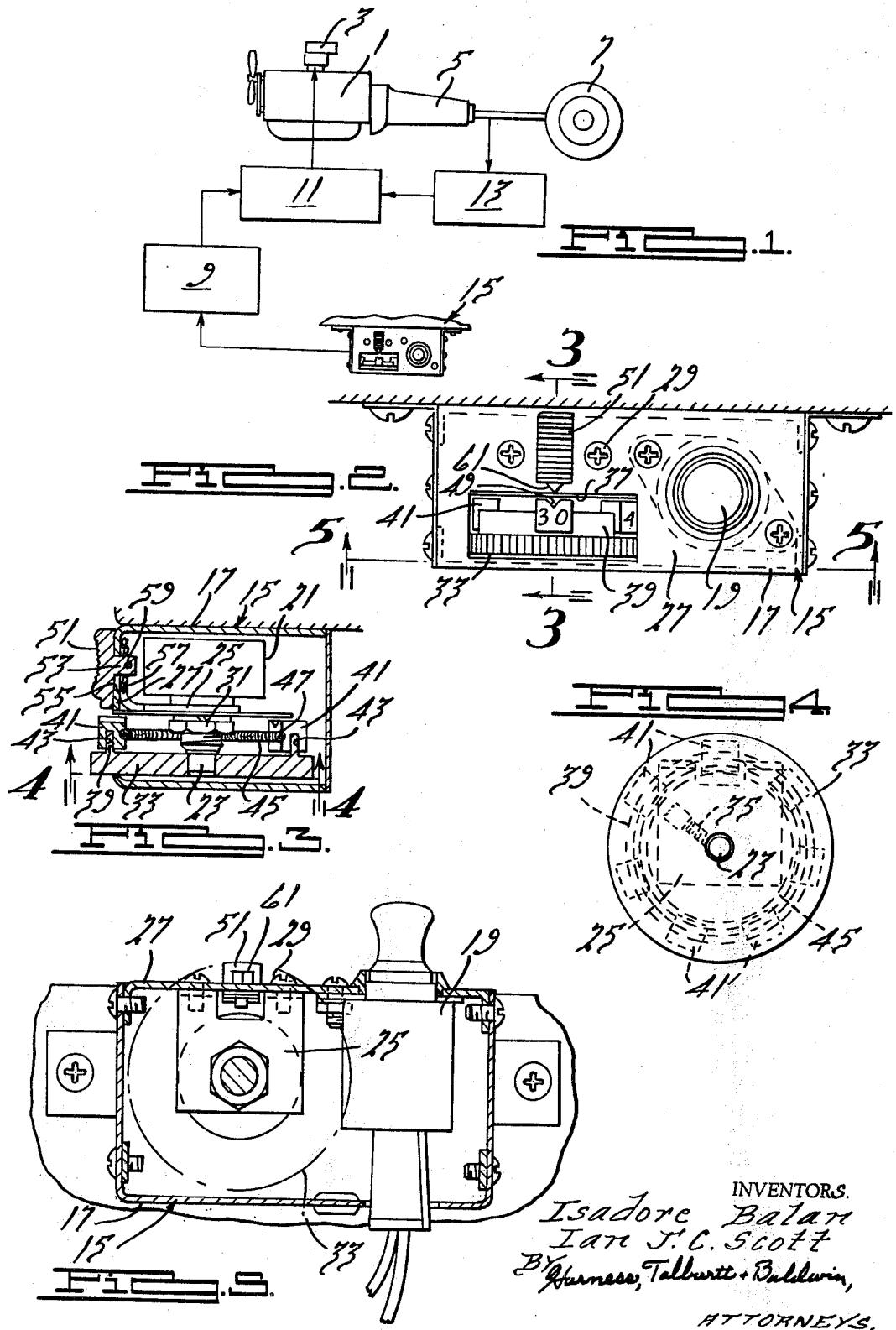

3,500,788
CONTROL UNIT
Isadore Balan, Oak Park, and Ian J. C. Scott, Madison Heights, Mich., assignors to Chrysler Corporation, Highland Park, Mich., a corporation of Delaware
Filed Mar. 15, 1967, Ser. No. 623,400
Int. Cl. B60k 31/00
U.S. Cl. 116—28                                10 Claims

ABSTRACT OF THE DISCLOSURE

Control unit for an automatic speed control system for a vehicle, the unit including a thumbwheel having a plurality of visual indicating members frictionally held on the thumbwheel but movable relative to the latter, each indicating member bearing indicia indicating a desired speed selection. A latching detent is provided for serving as a pointer and for locking each indicating member against movement when the thumbwheel is rotated to permit adjustment of the position of the indicating members on the thumbwheel.

BACKGROUND OF THE INVENTION

This invention relates to control systems, and more particularly to a control unit for an automatic speed control system for vehicles, the unit being adapted to be easily adjusted to make the speed indicated on the speedometer correspond with the speed setting on the control unit.

An automatic speed control system is a driver operated voluntary speed control. The control unit for the system is used to set a desired speed for existing driving conditions.

Automatic speed control systems may have a dial or thumbwheel bearing indicia indicative of various desired speeds, such as 30, 40, 50, etc., miles per hour. When the dial or thumbwheel is set on a particular speed setting, and the control switch is set on the automatic position, the vehicle speed will approach the desired speed setting on the dial or thumbwheel. When the vehicle speed desired is attained, the vehicle speed levels off and assumes a steady rate.

The systems usually include electrical and pneumatic circuits, and mechanical linkages, all of which function together to correlate the speed indicated on the speedometer to the desired speed setting. It will be understood that with the number of circuits and linkages in the system, adjustment of various components to correlate the speed setting with the speedometer indication could be a laborious and time consuming procedure. Moreover, the various components may perform in a non-linear fashion as vehicle speed increases or decreases.

One method of adjustment involves the setting of the dial or thumbwheel. The vehicle is first driven on a level stretch of road and the system switched on to automatic control at a very low speed setting. The dial or thumbwheel is carefully increased to a setting of 3 or 30, for example. The speedometer reading is recorded when the vehicle reaches a steady speed. The dial is then increased by a 10 mile increment to 4 or 40. Again the speedometer reading is recorded when the vehicle reaches a steady speed. This procedure is repeated at higher speeds until the normal driving range is covered. The procedure is again repeated from a high speed down to a low speed. After the speed run has been conducted, the recorded speedometer readings are examined. The dial or thumbwheel is usually spring loaded and may be adjusted without removal of the assembly from the instrument panel.

The dial or thumbwheel is adjusted for best overall correlation between the dial and the speedometer in the following manner: If the speed shown on the speedometer is less than the dial or thumbwheel setting, the dial or thumbwheel is moved to the extreme low speed end and slipped on its shaft the amount necessary to correct the calibration. The dial or thumbwheel is rotated to the other extreme end and slipped when the speedometer indicated speeds are higher than the settings.

It will be seen that the above adjusting procedure is time consuming and requires recording and analysis of various speeds. Moreover, only one amount of adjustment may be made either at the upper end of dial travel or at the lower end of dial travel. Thus, all of the variations in dial setting for speeds throughout the complete range must be averaged out and only one adjustment made. Since there are numerous circuits and mechanical linkages in the system the amount of adjustment necessary to correct a 30 mile per hour setting may not be the amount of adjustment necessary to correct a 40 or 50 mile per hour setting, for example, i.e., the adjustments may have a non-linear relationship to vehicle speed changes. In fact, the adjustment necessary to correct one setting may be in a direction opposite that necessary to correct another setting. In systems such as the type just described, only an overall correlation can be made between the control unit settings and the speedometer readings. The above disadvantages are overcome by the present invention.

SUMMARY OF THE INVENTION

Briefly, this invention relates to an automatic speed control unit for an automatic speed control system for vehicles having a movable member adapted, when moved from one position to another, to change an input signal to the system, a plurality of indicating members bearing desired speed indicating indicia, the indicating members being mounted and movable on the movable member, and latching means for holding one of the indicating members in a relatively fixed position when the movable member is moved.

One of the primary objects of this invention is to provide a control unit for an automatic speed control system which may be adjusted rapidly to correlate the speedometer speed indications with the selected speed indications.

Another object of this invention is to provide a control unit of the class described which permits individual control adjustment of each desired speed indicating member.

A further object of this invention is to provide a control unit such as described which permits the desired speed settings to be correlated with the speeds indicated on the speedometer without the necessity of recording various settings and speedometer readings during a test run of the vehicle.

Still another object of this invention is to provide a control unit of the type described which is simple and economical, and effective in operation.

Other objects and features of this invention will become apparent as the description progresses.

BRIEF DESCRIPTION OF THE DRAWINGS

In the drawings in which one of various possible embodiments is illustrated,

FIG. 1 is a schematic view of a speed control system having a control unit of this invention therein;

FIG. 2 is a front elevation of a control unit of this invention;

FIG. 3 is a section taken along line 3—3 of FIG. 2;

FIG. 4 is a section taken along line 4—4 of FIG. 3, certain parts removed for clarity; and FIG. 5 is a bottom plan view of FIG. 2, certain parts removed and other parts shown in phantom for clarity.

Like parts are indicated by corresponding reference characters throughout the several views of the drawings.

DESCRIPTION OF THE PREFERRED EMBODIMENT

Referring now to the drawings, an automatic speed control system for a vehicle is diagrammatically illustrated in FIG. 1. The vehicle engine is indicated at 1 and has a carburetor 3 connected thereto. A drive train 5 connects engine 1 to the rear wheels 7. Basically, the system includes means 9 for transmitting a particular speed setting request signal (such as a voltage signal) to a comparator 11, means 13 to transmit a vehicle speed signal (such as a voltage signal) from the drive train to the comparator, the comparator 11 being adapted to control the throttle (not shown) on the carburetor, and a control unit 15 for selecting a particular speed setting.

Referring now to FIGS. 2–5, a control unit 15 is shown to include a housing or support 17 adapted to be connected to the instrument panel. As shown, a switch 19 for actuating the speed control system is mounted in one portion of housing 17. However, the switch 19 could be located in other positions which may be easily reached by a vehicle operator. A rheostat 21 having a rotatable shaft 23 is mounted within housing 17 on an L-shaped bracket 25. Bracket 25 is secured to the front wall 27 of the housing by screws 29. Rheostat 21 is secured to bracket 25 by a locking nut 31.

A circular dial or thumbwheel 33 is pressed on the outer end of shaft 23 for rotating the shaft 23 upon rotation of the thumbwheel and is secured thereto by set screw 35 (see FIG. 4). The periphery of the thumbwheel projects forwardly through an opening 37 in the front wall 27 of the housing. Thumbwheel 33 has an ananular rib or flange 39 extending upwardly from the upper side thereof which acts as a rail for a plurality of visual indicating members 41 having arcuate slots 43 therein. The indicating members 41 are adapted to slide on rib 39 and, bear, indicia indicating desired speed selections on their outer faces. The members 41 are held in frictional contact with the rib 39 by a spring 45, which is preferably in the form of a coiled spring formed into an annular loop and is seated in recesses or grooves 47 on the inner sides of the indicating members. The members 41 ride with the thumbwheel 33 when the latter is rotated.

Each of the indicating members has a recess or V-shaped notch 49 in its upper side. A locking latch 51 engages the outside of front wall 27 and has a finger 53 extending inwardly through a slot 55 in the front wall. The latch is held adjacent the front wall by a spring 57 engaging the inside of the front wall and a pin 59 extending through the inner end of the finger 53. The latch 51 is adapted to be slid toward and away from the outer side margin of the thumbwheel. The end of the latch 51 adjacent the thumbwheel is formed as a knife-edge detent 61 which serves as a reference pointer for aligning the indicating members and when the latch 51 is moved toward an aligned indicating member 41 is adapted to nest in the V-shaped notch 49 in the particular indicating member. When the detent 61 is moved into the notch 49 of one indicating member the latter is held against movement. Thus, if the thumbwheel is rotated the indicating member 41 held by latch 51 slides relative to the thumbwheel and the coiled spring 45.

Operation of the control unit to obtain proper adjustment thereof relative to the speedometer readings is as follows:

First, assuming the vehicle is moving at a speed of about 35 miles per hour, the driver has actuated the energizing or conditioning switch 19, and the thumbwheel has been rotated until the notch 49 in the indicating member 41 bearing the indicia indicating the desired speed, such as 30 miles per hour, is aligned with the pointer or detent 61, the vehicle will retard its speed toward 30 miles per hour. If the vehicle speed decreases to a rate of 30 miles per hour as indicated on the speedometer and holds that speed, nothing further need be done for that particular indicating member. If, however, the vehicle levels off at a speed greater than 30 miles per hour as indicated by the speedometer, such as 33 miles per hour for example, the latch 51 is moved toward the thumbwheel to place detent 61 in the notch 49 of the indicating member 41. The thumbwheel is then used as the throttle control and is rotated in the proper direction to reduce the vehicle speed to 30 miles per hour as indicated on the speedometer. The indicating member bearing the 30 miles per hour indicia moves relative to the thumbwheel as the latter is rotated. It will be understood that rotation of the thumbwheel varies the voltage signal from the rheostat to the means 9 and causes the vehicle to change its rate of travel. When the vehicle has reached a speed of 30 miles per hour, rotation of the thumbwheel is stopped. Thus, the location of the indicating member 41 bearing the 30 mile per hour indicia will then be in the correct position on the thumbwheel for obtaining a speed of 30 miles per hour. The latch 51 is then slid away from the thumbwheel.

The thumbwheel is next rotated until the next indicating member 41, such as the member bearing indicia indicating 40 miles per hour for example, is aligned with the pointer or detent 61. Again, if the vehicle speed increases to a rate of 40 miles per hour as indicated on the speedometer and holds that speed, nothing further need be done for that particular indicating member. However, if the vehicle reaches a speed different from 40 miles per hour, such as 45 miles per hour or 36 miles per hour for example, the latch 51 is moved toward the thumbwheel to place detent 61 in the notch 49 of the indicating member 41. Again, the thumbwheel is used as the accelerator pedal and is rotated to bring the vehicle speed down or up, as the case may be, to 40 miles per hour as indicated on the speedometer. When the vehicle speed reaches 40 miles per hour the indicating member 41 bearing the indicia indicative of 40 miles per hour is in the proper position. This procedure is repeated for higher speeds until the normal driving range is covered.

It will be understood that some of the speed related components of a vehicle do not always put out a signal which increases linearly as the speed increases. The speedometer is a primary example of such a component. The control unit of this invention automatically compensates for these non-linear variations. The spacing between the indicating members 41 after adjustment of the latter may vary between adjacent indicating members, but the members will all be in their proper position for signaling the respective speeds indicated by the indicia thereon.

In view of the foregoing it will be seen that the several objects and other advantages of this invention are achieved.

It will be understood that the invention is not to be limited to the exact construction shown and described, but that various changes and modifications may be made without departing from the spirit and scope of the invention.

What is claimed is:

1. A control unit for use with an associated control system responsive to any of a plurality of input signals, comprising a support, a movable member mounted on said support, a device for emitting signals connected to said movable member, said device for emitting signals being adapted, when said unit is connected to said control system and when said movable member is moved from one position to another, to change a desired result input signal to said system, different positions of said movable member causing said device to emit different signals indicative of different desired results, a plurality of indicator members bearing desired result indicating indicia, the indicating members being frictionally mounted on said movable member, each indicating member being movable relative to said movable member when the former is held against movement and the latter is moved, whereby when said unit is connected to said control system said indicating members may be individually positioned on said movable member to substantially correspond with the desired result input signal emitted from said device for emitting signals when it is in selected positions, said movable member comprising a rotatable thumbwheel, said thumbwheel having a curved rib extending away from one face thereof, said indicating members having slots therein, said rib extending into said slots, and means biasing said indicating members into engagement with said rib.

2. A control unit for use with an associated control system responsive to any of a plurality of input signals, comprising a support, a movable member mounted on said support, a device for emitting signals connected to said movable member, said device for emitting signals being adapted, when said unit is connected to said control system and when said movable member is moved from one position to another, to change a desired result input signal to said system, different positions of said movable member causing said device to emit different signals indicative of different desired results, a plurality of indicator members bearing desired result indicating indicia, the indicating members being frictionally mounted on said movable member, each indicating member being movable relative to said movable member when the former is held against movement and the latter is moved, whereby when said unit is connected to said control system said indicating members may be individually positioned on said movable member to substantially correspond with the desired result input signal emitted from said device for emitting signals when it is in selected positions, and a movable detent on said support adapted to be moved into engagement with each of said indicating members for holding the latter against movement with said movable member.

3. A control unit for use with an associated control system responsive to any of a plurality of input signals, comprising a support, a movable member mounted on said support, a device for emitting signals connected to said movable member, said device for emitting signals being adapted, when said unit is connected to said control system and when said movable member is moved from one position to another, to change a desired result input signal to said system, different positions of said movable member causing said device to emit different signals indicative of different desired results, a plurality of indicator members bearing desired result indicating indicia, the indicating members being frictionally mounted on said movable member, each indicating member being movable relative to said movable member when the former is held against movement and the latter is moved, whereby when said unit is connected to said control system said indicating members may be individually positioned on said movable member to substantially correspond with the desired result input signal emitted from said device for emitting signals when it is in selected positions, each of said indicating members having a groove in one side thereof, said unit including a movable latching member thereon, said latching member having a detent thereon adapted, upon movement of said latching member towards an indicating member, to enter into the groove of the respective indicating member and lock the latter against movement with said movable member.

4. A control unit as set forth in claim 3 wherein said movable member comprises a rotatable thumbwheel, said thumbwheel having a curved rib extending away from one face thereof, said indicating member having slots therein, said rib extending into said slots, and means biasing said indicating member into engagement with said rib.

5. A control unit as set forth in claim 4 wherein said means biasing said indicating members into engagement with said rib comprises a coiled spring formed into a loop and engaging the indicating members inside said rib.

6. A control unit for use with an associated control system responsive to any of a plurality of input signals, comprising a support, a movable member mounted on said support, a device for emitting signals connected to said movable member, said device for emitting signals being adapted when said unit is connected to said control system and when said movable member is moved from one position to another, to change a desired result input signal to said system, different positions of said movable member causing said device to emit different signals indicative of different desired results, a plurality of indicator members bearing desired result indicating indicia, the indicating members being mounted for movement relative to said movable member, and means for selectively locating each of said indicating members in a particular position when said movable member is moved to a position indicative of a particular desired result input signal, said means including a detent mounted for movement relative to said support, said detent being movable into selective engagement with said indicating members to hold the selected indicating member against movement relative to the detent when said movable member is moved.

7. A control unit for a vehicle automatic speed control system responsive to any of a plurality of input signals comprising a support, a rotatable member mounted on said support, a device for emitting signals connected to said movable member, said signaling device being adapted, when rotated from one position to another by said rotatable member, to change a desired speed input signal to the system, different positions of said rotatable member causing said device to emit different signals indicative of different desired speeds, a plurality of desired speed indicating members, each bearing indicia indicative of a different desired speed and being movably mounted on said said rotatable member, and means on said support for selectively holding said desired speed indicating members against movement when said rotatable member is rotated to facilitate positioning of said speed indicating members on said rotatable member in positions wherein the indicia on said speed indicating members substantially correspond to the speed signals emitted from said device for emitting signals when said rotatable member is in the positions necessary to cause said device to emit speed signals corresponding to the indicia on said speed indicating members, said support comprising a housing, said rotatable member having a curved rib extending away from one face thereof, said speed indicating members having curved slots therein, said rib extending into said curved slots, and means biasing said indicating members into engagement with said rotatable member.

8. A control unit as set forth in claim 7 wherein said means for selectively holding said indicating members against movement comprises a latching member slideably mounted on said support, said indicating members having recesses therein, said latching member being selectively movable into the recesses of said indicating members.

9. A control unit as set forth in claim 8 wherein said means biasing said indicating members into engagement with said rotatable members comprises a coiled spring formed into a loop and engaging the indicating members inside said rib.

10. A control unit as set forth in claim 8 wherein said indicating members have recesses on the radially inner face thereof, said means biasing said indicating members into engagement with said rotatable members comprising a coiled spring formed into a loop and seated in the recesses on the radially inner faces of said indicating members.

(References on following page)

References Cited

UNITED STATES PATENTS

| | | | |
|---|---|---|---|
| 2,356,935 | 8/1944 | Koch | 74—10 |
| 2,635,578 | 4/1953 | Hanson et al. | 74—10.1 X |
| 2,816,617 | 12/1957 | Lee | 123—102 X |
| 3,070,185 | 12/1962 | Fales. | |
| 3,172,497 | 3/1965 | Stoner et al. | 180—109 |
| 3,195,358 | 7/1965 | Davidson et al. | 74—10.1 |
| 2,161,344 | 6/1939 | Fuller. | |

FOREIGN PATENTS 11,213  1885  Great Britain.

LOUIS R. PRINCE, Primary Examiner

D. M. YASICH, Assistant Examiner

U.S. Cl. X.R.

116—116; 180—109